United States Patent [19]

Stouffer et al.

[11] Patent Number: 5,259,815
[45] Date of Patent: Nov. 9, 1993

[54] AIR OUTLET WITH APERIODIC OSCILLATION

[75] Inventors: Ronald D. Stouffer, Silver Spring; Michael C. David, Catonsville; David A. Bray, Columbia, all of Md.

[73] Assignee: Bowles Fluidics Corporation, Columbia, Md.

[21] Appl. No.: 562,854

[22] Filed: Aug. 3, 1990

[51] Int. Cl.⁵ .............................................. B60H 1/00
[52] U.S. Cl. .................... 454/125; 454/153; 454/285; 239/102.1; 239/DIG. 7
[58] Field of Search .............. 98/2, 2.05, 2.06, 2.11, 98/2.08, 2.09, 40.18; 239/589.1, 590.5, DIG. 7, 102.1

[56] References Cited

U.S. PATENT DOCUMENTS

| | | | |
|---|---|---|---|
| 3,824,910 | 7/1974 | Temming | 98/2 |
| 4,055,306 | 10/1977 | Hruby, Jr. | 239/589.1 |
| 4,266,722 | 5/1981 | Nawa et al. | 98/40.18 |
| 4,326,452 | 4/1982 | Nawa et al. | 239/590.5 |
| 4,407,186 | 10/1983 | Izumi et al. | 98/2 |
| 4,416,192 | 11/1983 | Izumi et al. | 98/2 |

FOREIGN PATENT DOCUMENTS

| | | | |
|---|---|---|---|
| 0040041 | 4/1981 | Japan | 98/40.18 |
| 0002948 | 1/1982 | Japan | 98/40.18 |
| 0009145 | 1/1987 | Japan | 98/40.18 |
| 8706201 | 10/1987 | PCT Int'l Appl. | 98/40.18 |

*Primary Examiner*—Albert J. Makay
*Assistant Examiner*—William C. Doerrler
*Attorney, Agent, or Firm*—Jim Zegeer

[57] ABSTRACT

A air outlet for a passenger compartment of a vehicle has a duct forming a jet of air, a pair of lateral sidewalls, bounded by the top and bottom walls diverging from each other from their upstream ends to their downstream ends at a rate sufficient to preclude a stable wall effect and for causing aperiodic oscillation of the jet into the passenger compartment of said vehicle. Various means are disclosed to further destabilize the wall effect.

13 Claims, 1 Drawing Sheet

5,259,815

AIR OUTLET WITH APERIODIC OSCILLATION

BACKGROUND AND BRIEF DESCRIPTION OF THE INVENTION

The present invention relates to heating and air conditioning outlets, particularly heating and air conditioning outlets for vehicles.

In U.S. Pat. 4,644,854, assigned the assignee hereof, and in a number similar patents, air outlets, particularly for vehicles, and more particularly for the defroster outlets, a jet of heated air or defrost air is caused to sweep upon a windshield with the objective being the avoidance of diffusion of the heated air jet prior to impacting on the windshield so that the maximum heat energy is delivered to the windshield. In cases of heating or cooling the interior of the vehicle, air outlets which project a stream of air into the vehicle it is known that a concentrated jet as opposed to a diffused jet "throws" further, that is, it projects further into the space to be heated. See Stouffer U.S. Pat. 4,250,799. In these cases, a fluidic oscillator rhythmically or periodically causes the jet to sweep back and forth at predetermined rates and are used to accomplish these ends. In order to achieve periodic oscillation, the unit disclosed in U.S. Pat. No. 4,644,854 uses a continuous inertance loop connected between the control ports, for example. In Stouffer U.S. Pat. Nos. 4,250,799 and 4,437,392 an air operated oscillator vane is used to periodically oscillate the jet. In some cases, mechanical contrivances such as solenoids, motors and the like (see Kakei U.S. Pat. Nos. 3,745,906 and 3,832,939) have been used to cause the nozzle to sweep back and forth to cause the jet to periodically sweep back and forth into the interior compartment of the vehicle. Movable grates or rotating diffuser grills have likewise been used to cause the directional change of the air into the interior of the vehicle. In all these cases, there is a periodic motion of the jet, caused either by some mechanical contrivance or by fluidic flow phenomena involving no moving parts. Moreover, such prior systems have not been produced in a single-piece molding which is cheaper and can be designed for ease of installation and application to the duct issuing air to the passenger compartment of a vehicle, for example.

Accordingly, an object of the invention is to provide a air outlet which causes aperiodic sweeping movement of the concentrated air jet so as to more efficiently heat or cool the compartment but, at the same time, avoid a continuous jet of air blasting in the same direction, for example, upon an occupant's face or body. Instead of structures which cause a periodic oscillation of the jet, an object of the present invention is to provide a molded outlet fixture which provides aperiodic oscillation of the heated jet and which preferably can be molded in one-piece. According to the invention, an air outlet for a vehicle includes a pair of laterally diverging sidewalls which diverge from each other at a rate or degree sufficient to preclude stable wall effects and for causing aperiodic oscillation of the jet into the passenger compartment of the vehicle.

In a preferred embodiment, the jet issues through an aperture which has off-sets from spaced sidewalls which diverge at an angle greater than about 45 degrees and there is openings provided so as to permit entrainment of ambient air and reduce the time between oscillation or change of direction of the air jet. In a most preferred embodiment, a pair of parallel walls are upstream of the diverging walls and a series of gaps, apertures or holes are provided at the juncture of the parallel walls and the diverging walls with the size of the apertures or holes controlling the dwell time of the jet at each extreme deflection position. Moreover, the downstream outlet aperture may be loaded by a pair of loading vanes so that any attachment effects is rendered quite unstable and the jet sweeps but at a very unperiodic rate.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
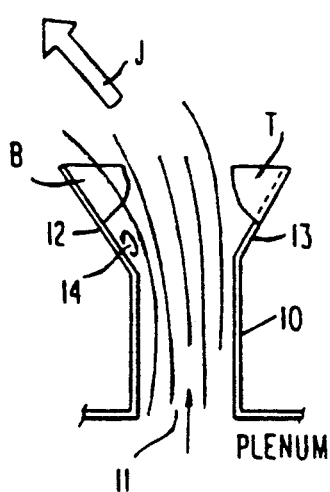
FIG. 1 is a view of a hot air outlet in which the sidewalls have a divergent angle which produces a stable wall effect so that the jet will attach to one wall or the other and remain attached and there is no oscillation or change of direction of the jet.

FIG. 1 illustrates the fundamental coanda or wall attachment effect in which a flow of air, such as heated air from a supply 11 is coupled to a pair of diverging sidewalls 12 and 13, respectively bounded by top wall "T" and bottom wall "B". Due to the coanda effect or wall effect principles, ambient air is entrained and a bubble 14 or region of reduced pressure is formed on one side which causes a deflection of the jet to, for example, the left side as illustrated in FIG. 1 to the wall or coanda effect, the jet will remain stable or dwell continuously on the left side and attach to wall 12. If such a construction were used for an hot air outlet, and in a vehicle, for example, there would be a hot spot on a passenger, for example, and because of the concentrated nature of the jet, it could become quite uncomfortable.

In the least preferred embodiment of the invention, the air from supply 11 is passed through duct 10, having straight sidewalls 10L and 10R, to a pair of diverging sidewalls 15 and 16 bounded by top and bottom walls T and B, and, as indicated, the sidewalls 15 and 16 diverge at an angle greater than 45 degrees. This produces a certain degree of unstableness in the coanda or wall effect and, in the arrangement shown, the jet is temporarily attached to diverging wall 15 but, due to the unstableness of this arrangement caused by the large divergent wall angle, the attachment bubble 17 will lose its effect on the wall and the jet will sweep to the middle of the outlet or to opposite side wall 16 and remain attached to that wall and dwell these for an irregular period of time. The change from one side to the other is unpredictable in time and thus is aperiodic in nature. However, since the dwell time may be several seconds to minutes, this is a less preferred embodiment but it illustrates the basic principle of the invention, namely, the aperiodic nature of the oscillation.

Figure 2:
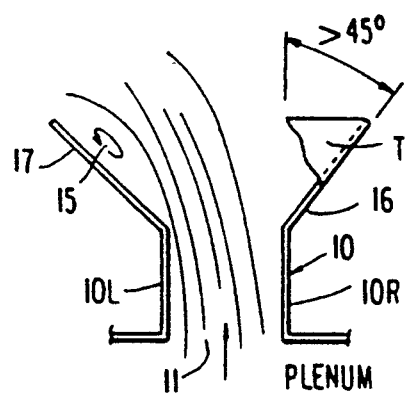
FIG. 2 illustrates a first and least preferred embodiment of the invention in which the coanda or wall attachment effect is made unstable by the diverging walls diverge at a degree sufficient to preclude stable wall effect.
Figure 3:
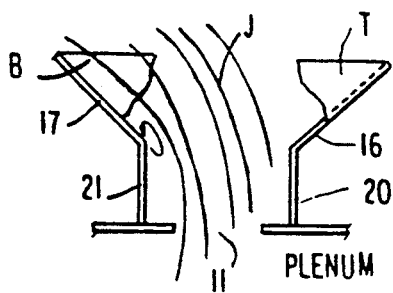
FIG. 3 is a more preferred embodiment of the invention in which the unstable wall effect is enhanced by providing off-set, thereby reducing the dwell time.

The time period or dwell time that the jet remains in one position or the other is too great in the embodiment shown in FIG. 2 and in order to further destabilize or make the wall effect less stable, the embodiment shown in FIG. 3 is provided. In this embodiment, the substantially straight walls 20 and 21 are set back from the opening 11 a predetermined distance so that in conjunction with the divergence angle of diverging sidewalls 16 and 17, a more unstable situation exists so that the rate of shifting is enhanced but is still very aperiodic. In other words, the jet J will attach and detach to walls 15 or 16 for an indeterminate period of time which is still faster than the time period that the jet would stay attached to the walls 15 or 16 in the embodiment shown in FIG. 2 but still be very aperiodic. Likewise, when the jet shifts over to, and becomes attached to wall 16, it will remain or dwell there for an indeterminate period of time which is significantly shorter than the period of time that the jet remains attached to wall 16 of FIG. 2. Thus, for use in vehicles and the like, this is a more preferred embodiment.

Figure 4:
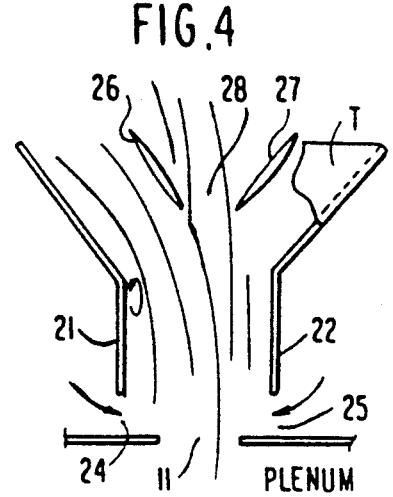
FIG. 4 is a more preferred embodiment of the invention in which there is provided a space for entrainment of ambient air and a downstream loading by means of loading vanes.

A still more preferred embodiment is illustrated in FIG. 4. In this case, in addition to the larger diverging angle, and the offset, there has been added two additional features, namely, the walls 21 and 22 are spaced slightly from the surfaces bounding the inlet aperture 11 to form gaps or apertures 24, 25 and thus permit entrainment of ambient air from both sides. In addition, there is provided a pair of loading vanes 26, 27 which are spaced apart as at 28. The effect of the loading vanes, diverging wall 16, 17, offsets 22, 23 and the enhanced divergence of wall 16, 17 is to produce an even more unstable coanda or wall attachment effect. In this case, the aperiodic nature of the jet's attachment can be reduced down to the order of under one second to several seconds with the time period being indeterminate and thus the jet sweeps in an aperiodic manner. Also in this embodiment there is always some flow in gap 28.

Figure 5:
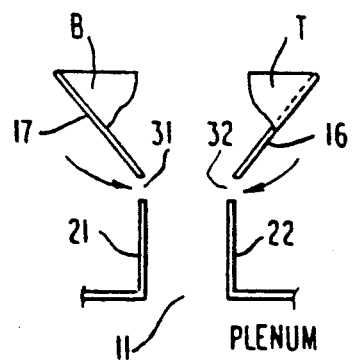
FIG. 5 is a more preferred embodiment of the invention in which ambient air is entrained at about the juncture of a pair of straight walls and the diverging sidewalls.

A still more preferred embodiment of the invention is shown in FIG. 5. In this case, the juncture of walls 21, 22 with diverging walls 16 and 17 is provided with a series of apertures, gaps or holes 31 and 32 with the size of the gaps, apertures or holes controlling the dwell time of the jet. A larger gap results in a smaller dwell time and vice versa. Thus, the maximum dwell time can be varied or adjusted.

For the different uses in a vehicle, the following table sets out preferred dwell times of different outlets:

TABLE I

| USE | DWELL TIME |
| --- | --- |
| Defroster | Minimum 1 second-maximum 3 seconds |
| Heater Nozzle | 1 second |
| Air Conditioner | 1 second |

Figure 6:
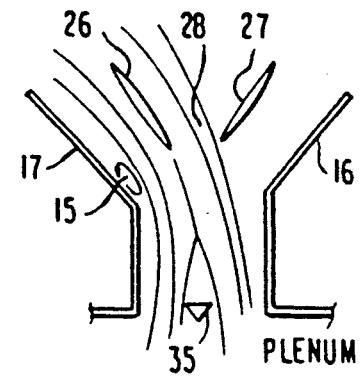
FIG. 6 is a further embodiment illustrating the use of an island or barrier.

In FIG. 6, in addition to the loading vanes 26, 27, a barrier 35 divides the single jet to help destabilize attachment which produces an even more unstable wall attachment effect.

The basic advantage of the invention is that it can be produced as a one-piece molding which is thus cheaper. Moreover, since it does not require feedback loops, passages and the like, it is less bulky and is more amenable or adaptable to plugging into the outlet duct of a hot air distribution system and, particularly, the hot air distribution system of an automobile.

While there has been shown and described a number of different embodiments of the invention, it will be appreciated that numerous other embodiments and adaptations of the invention will be readily apparent and it is intended that all such embodiments and adaptations of the invention be encompassed by the claims appended hereto.

What is claimed is:

1. A air outlet for a vehicle comprising:
   means forming a jet of air,
   a pair of top walls,
   a pair of lateral sidewalls bounded by said top walls and diverging from each other from their upstream ends to their downstream ends at a rate sufficient to preclude a stable wall effect for air issuing at a given velocity and for causing aperiodic oscillation of said jet into the passenger compartment of said vehicle.

2. The invention defined in claim 1 wherein said pair of lateral sidewalls have upstream and downstream ends, and means for allowing the entrainment of ambient air at said upstream ends of said pair of lateral sidewalls.

3. The invention defined in claim 1 including a pair of substantially parallel walls connected to said upstream ends, respectively, and spaced apart a distance greater than the width of said jet to create a set back between said jet and said parallel walls, respectively.

4. The invention defined in claims 1 or 2 or 3 including means for loading said outlet.

5. The invention defined in claims 1 or 2 including loading vanes between the downstream ends of said diverging walls and transverse to said top walls.

6. The invention defined in claim 3 including means spacing the upstream ends of said parallel walls from said means for forming an opening to allow the entrainment of ambient air by said jet.

7. A air outlet for the passenger compartment of a vehicle comprising:
   means forming a jet of air, and means for causing aperiodic oscillation of said jet of air comprising:
   a pair of spaced planar bounding walls,
   a pair of lateral sidewalls bounded by said spaced planar bounding walls, said pair of lateral sidewalls have upstream and downstream ends, said pair of lateral sidewalls diverging from each other from their upstream ends to their downstream ends at a rate sufficient to preclude a stable wall effect for air at a given air flow rate and for causing aperiodic sweeping of said jet of air into the passenger compartment of said vehicle such that heated and cooled air issuing from said outlet does aperiodically impinge on a passenger.

8. The invention defined in claim 7 including means for allowing the entrainment of ambient air at said upstream ends of said pair of lateral sidewalls.

9. The invention defined in claims 7 or 8 including means for loading said outlet.

10. The invention defined in claims 7 or 8 including loading vanes between the downstream ends of said diverging walls and transverse to said top walls.

11. The invention defined in claim 7 which said air outlet is made of molded plastic and is molded in one piece.

12. The invention defined in claim 7 wherein said air outlet is a defroster nozzle and said wall effect has a minimum dwell time of one second and a maximum dwell time of three seconds.

13. The invention defined in claim 7 wherein said air outlet is a heating and air-conditioning outlet and the wall effect cause a dwell time of about one second.

* * * * *